M. T. SKINNER.
WING SWEEP ATTACHMENT FOR PLOWS.
APPLICATION FILED AUG. 28, 1916.

1,230,233.

Patented June 19, 1917.

INVENTOR.
M. T. Skinner
BY
John M. Spellman
ATTORNEY.

UNITED STATES PATENT OFFICE.

M. T. SKINNER, OF CLEBURNE, TEXAS.

WING-SWEEP ATTACHMENT FOR PLOWS.

1,230,233.  Specification of Letters Patent.  Patented June 19, 1917.

Application filed August 28, 1916. Serial No. 117,174.

*To all whom it may concern:*

Be it known that I, M. T. SKINNER, a citizen of the United States, residing at Cleburne, in the county of Johnson and State of Texas, have invented certain new and useful Improvements in Wing-Sweep Attachments for Plows, of which the following is a specification.

My invention has relation to an attachment for plows, cultivators or the like whereby the implement may readily be provided with wing sweeps without disarrangement or reconstruction of the old parts of implement, and in such connection it relates more particularly to the form, construction and arrangement of the attachment.

It has been proposed heretofore to provide an attachment for shovel plows or cultivators to convert the same into sweep plows adapted to be operated between rows of growing crops, and said attachment was provided with means for adjusting the length or width of the sweeps. In such former attachments, as for instance in Letters Patent No. 485,732 of November 8, 1892, a cross piece or bar is removably secured to the standard of the plow and a semicircular strap carrying the sweeps is removably secured at each of its ends to the ends of the cross piece.

Such constructions present many difficulties to their successful adaptation to all forms of plows as well as to their successful operation when attached to the plow. Thus the cross piece for one form of plow could not be used with another form and the semicircular strap must be attached to or removed from succeeding cross pieces by a connection which materially decreased the strength and rigidity of the attachment as well as presented crevices for the reception of weeds or trash which most speedily put the plow and attachment out of use, until the trash was removed.

It is the main object of my present invention to provide an attachment which may be applied to any plow, cultivator or digging implement to convert the implement into a sweep plow and as an essential part of the attachment to provide a continuous annulus or ring having the front portion of its periphery slightly inclined and substantially lengthened in an upward direction whereby the ring may be readily secured by a plurality of fastenings to the plow or implement when desired.

A secondary object of my invention is to provide the ring with corrugations on its exterior surface adjacent to the slots in which the shanks of the wing sweeps are adjustable and to provide washers having vertically arranged corrugations or ridges surrounding the shanks and coöperating with the corrugated surface of the ring to lock the wing sweeps fast to said ring.

The nature and scope of my invention will be more fully understood from the following description taken in connection with the accompanying drawings forming part hereof, in which—

Figure 1:
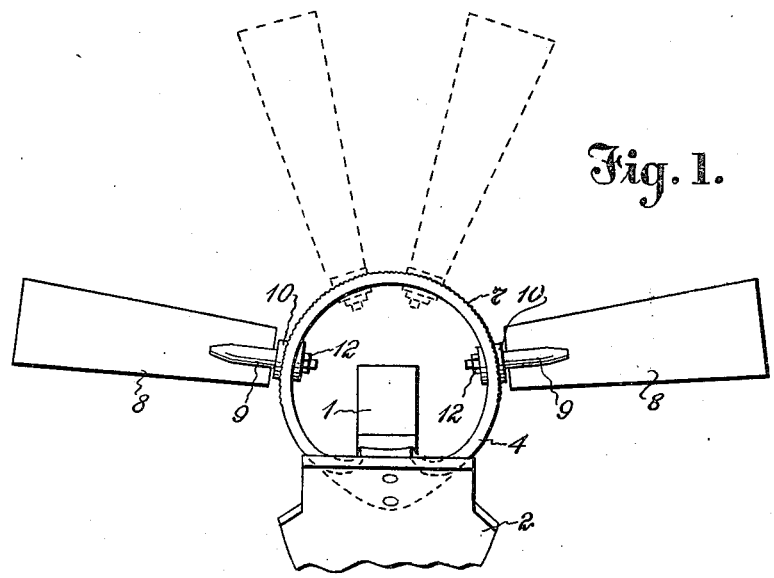
Figure 1 is a top or plan view of the attachment embodying the main features of my invention and of the parts of a plow to which the attachment is secured.
Figure 2:
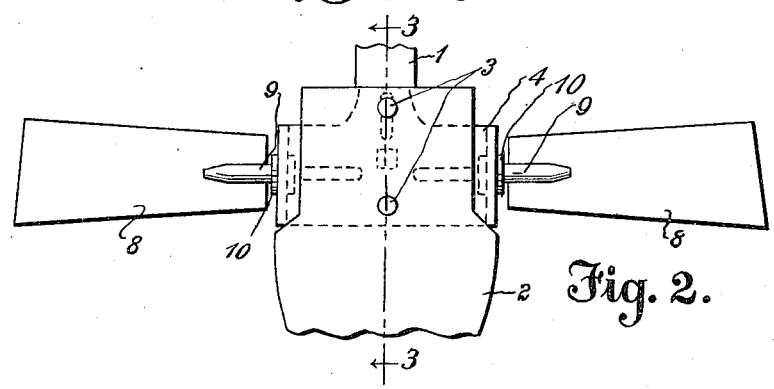
Fig. 2, is a front elevational view of the same.
Figures 3, 4:
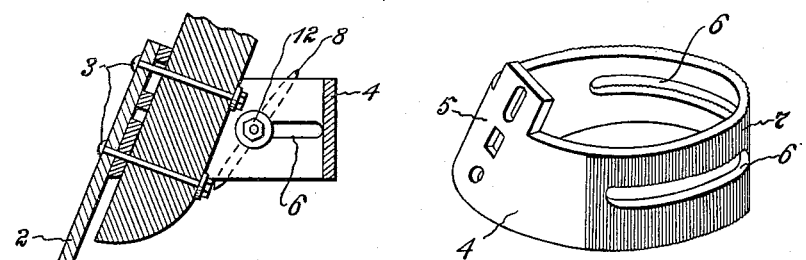
Fig. 3, is a cross sectional view taken on the line 3—3 of Fig. 2.
Fig. 4, is a perspective view of the ring detached from the plow and from the sweeps.
Figure 5:
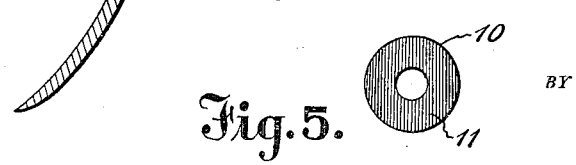
Fig. 5, is an inside view of one of the corrugated or ridged washers for the sweeps.

Referring to the drawings, 1 represents the standard of the plow or similar implement and 2 is the shovel plow secured to said standard 1 by the bolts 3.

Between the plow 2 and the standard 1 and secures by the bolts 3 thereto is an annulus or ring 4 having its front portion 5 slightly inclined to follow the plane of the plow and standard and having this front inclined portion 5 lengthened to adapt the ring for attachment to varying forms of plows.

The ring 4 has its body or rear portion slotted as at 6 and the outer face of this body portion is vertically ribbed or corrugated as at 7 adjacent to said slots 6.

The wing sweeps 8 have shanks 9 entering the slots 6 and on each shank 9 between the body of a sweep 8 and the corrugated face of the ring 4 is placed a washer 10 having its inner face ribbed or corrugated as at 11 to fit into and interlock with the corrugations of the ring. The inner end of each shank 9 is screw threaded to receive a nut 12 and as this nut is advanced on the shank it clamps the shank and washer to the ring to prevent turning of the wing or slipping of the shank in the slot 6.

I do not desire to claim as my present invention the attachment of wing sweeps to plows such being old in the art. I do desire to claim the form of ring and the particular means of securing the wing sweeps to the ring since by the use of such ring and such means I am enabled to attach a wing sweep to any known form of plow and the attachment when in place is rigid, strong and unbreakable and presents no crevices or cracks to engage weeds or trash during the plowing operation.

Having thus described the nature and objects of my invention what I claim as new and desire to secure by Letters Patent, is:—

1. In a wing sweep attachment for plows a continuous ring having the front portion of its periphery inclined and extended upward and its rear or body portion slotted to receive the sweeps, combined with means for adjustably attaching the upwardly extending front portion of the ring to the standard of the plow.

2. In a wing sweep attachment for plows a continuous ring having its front portion inclined and extended upward and its rear or body portion slotted to receive the sweeps, the exterior face of the body portion being vertically ribbed in combination with a sweep having a shank detachably locked to the slotted body of the ring and a washer having its inner face vertically ribbed, said washer arranged on the shank of the sweep adjacent to the outer ribbed face of the ring and interlocking with said ribbed face combined with means for adjustably attaching the upwardly extending front portion of the ring to the standard of the plow.

In testimony whereof I have signed my name to this specification.

M. T. SKINNER.

Copies of this patent may be obtained for five cents each, by addressing the "Commissioner of Patents, Washington, D. C."